US010899448B2

(12) United States Patent
Shannon et al.

(10) Patent No.: US 10,899,448 B2
(45) Date of Patent: *Jan. 26, 2021

(54) APPARATUSES FOR RELEASING A PAYLOAD FROM AN AERIAL TETHER

(71) Applicant: Wing Aviation LLC, Mountain View, CA (US)

(72) Inventors: Trevor Shannon, Mountain View, CA (US); Zhefei Li, Sunnyvale, CA (US)

(73) Assignee: Wing Aviation LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/890,548

(22) Filed: Jun. 2, 2020

(65) Prior Publication Data

US 2020/0298972 A1 Sep. 24, 2020

Related U.S. Application Data

(60) Continuation of application No. 16/404,090, filed on May 6, 2019, now Pat. No. 10,710,720, which is a (Continued)

(51) Int. Cl.
*B64D 1/02* (2006.01)
*B64D 1/12* (2006.01)
(Continued)

(52) U.S. Cl.
CPC .............. *B64D 1/02* (2013.01); *B64C 39/024* (2013.01); *B64D 1/12* (2013.01); *B64D 3/00* (2013.01);
(Continued)

(58) Field of Classification Search
CPC ... B64D 1/12; B64D 1/08; B64D 1/02; B64D 3/00; B64C 2201/128; B66C 1/38
See application file for complete search history.

(56) References Cited

U.S. PATENT DOCUMENTS 3,964,777 A 6/1976 Lindqvist
4,130,313 A 12/1978 Clifford
(Continued)

FOREIGN PATENT DOCUMENTS

JP 2003-154198 5/2003

OTHER PUBLICATIONS

European Patent Office, Extended European Search Report dated Dec. 20, 2019, issued in connection with European Patent Application No. 17810696.5, 5 pages.
(Continued)

*Primary Examiner* — Richard R. Green
(74) *Attorney, Agent, or Firm* — Mcdonnell Boehnen Hulbert & Berghoff LLP

(57) ABSTRACT

Described herein are apparatuses for passively releasing a payload of an unmanned aerial vehicle (UAV). An example apparatus may include, among other features, (i) a housing; (ii) a swing arm coupled to the housing, wherein the swing arm is operable to toggle between an open position and a closed position; (iii) a spring mechanism adapted to exert a force on the swing arm from the open position toward the closed position; (iv) a receiving system of a UAV adapted to receive the housing, wherein the receiving system causes the swing arm to be arranged in the open position; and (v) a spool operable to unwind and wind a tether coupled to the housing, wherein unwinding the tether causes a descent of the housing from the receiving system, and wherein winding the tether causes an ascent of the housing to the receiving system.

11 Claims, 11 Drawing Sheets

Related U.S. Application Data division of application No. 15/179,585, filed on Jun. 10, 2016, now Pat. No. 10,315,764.

(51) Int. Cl.

| | |
|---|---|
| ***B64D 3/00*** | (2006.01) |
| ***B64D 9/00*** | (2006.01) |
| ***B64C 39/02*** | (2006.01) |

(52) U.S. Cl.

CPC .. *B64C 2201/042* (2013.01); *B64C 2201/127* (2013.01); *B64C 2201/128* (2013.01); *B64C 2201/141* (2013.01); *B64C 2201/145* (2013.01); *B64C 2201/146* (2013.01); *B64D 9/00* (2013.01)

(56) References Cited

U.S. PATENT DOCUMENTS

| | | | |
|---|---|---|---|
| 4,264,098 | A | 4/1981 | Haake |
| 4,401,334 | A | 8/1983 | Kraeling, Jr. |
| 4,537,434 | A | 8/1985 | Piercy |
| 7,762,194 | B2 | 7/2010 | Gaigler |
| 8,162,263 | B2 | 4/2012 | Wong et al. |
| 9,085,362 | B1 | 7/2015 | Kilian et al. |
| 9,132,995 | B2 | 9/2015 | Schafer |
| 9,205,922 | B1 | 12/2015 | Bouwer |
| 9,308,994 | B2 | 4/2016 | Uskert et al. |
| 9,321,531 | B1 | 4/2016 | Takayama et al. |
| 10,315,764 | B2 | 6/2019 | Shannon et al. |
| 2011/0227350 | A1 | 9/2011 | Do |
| 2015/0151950 | A1 | 6/2015 | Schafer |
| 2015/0158587 | A1 | 6/2015 | Patrick et al. |

OTHER PUBLICATIONS

International Searching Authority, International Search Report and Written Opinion dated Aug. 10, 2017, issued in connection with International Patent Application No. PCT/US2017/033888, filed May 22, 2017, 9 pages.

APPARATUSES FOR RELEASING A PAYLOAD FROM AN AERIAL TETHER

CROSS-REFERENCE TO RELATED APPLICATION

This application is a continuation of U.S. patent application Ser. No. 16/404,090, filed May 6, 2019, which is a divisional of co-owned U.S. patent application Ser. No. 15/179,585, filed Jun. 10, 2016, both of which are incorporated herein by reference in their entirety and for all purposes.

BACKGROUND

Unless otherwise indicated herein, the materials described in this section are not prior art to the claims in this application and are not admitted to be prior art by inclusion in this section.

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Unmanned aerial vehicles (UAVs) may be used to transport payloads to various target locations. In order to automate transportation and delivery of a payload, a UAV may be configured to detach the payload from the UAV upon reaching a target location without human intervention. One way to do this is through active, or powered, release mechanisms. Such active release mechanisms may include various electronics, power supplies, and robotic devices, which can add size, weight, and complexity to the UAV. Further, detaching the payload from the UAV may involve lowering the payload to the ground by a tether, and, as such, it may be difficult to send power or electronic communications to an active release mechanism due to the remoteness of the payload from the UAV. Thus, the present disclosure discloses apparatuses for passively (i.e., without the use of electricity) releasing a payload from a UAV tether in order to help address these or other issues.

In one aspect, an apparatus includes: (i) a housing; (ii) a swing arm coupled to the housing proximate to a first end of the swing arm, wherein the swing arm is operable to toggle between an open position and a closed position, wherein the closed position locates a second end of the swing arm within the housing, wherein the open position exposes the second end of the swing arm outside the housing at an acute angle with respect to a sidewall of the housing, and wherein the swing arm is adapted to secure a payload of an aerial vehicle when arranged in the open position; (iii) a spring mechanism adapted to exert a force on the swing arm, wherein the force is exerted in a direction from the open position toward the closed position; (iv) a receiving system adapted to receive the housing, wherein the receiving system contacts a cam of the swing arm when receiving the housing, thereby causing the swing arm to be arranged in the open position, and wherein the receiving system is further adapted to be coupled to the aerial vehicle; and (v) a spool operable to unwind and wind a tether coupled to the housing, wherein unwinding the tether causes a descent of the housing from the receiving system, and wherein winding the tether causes an ascent of the housing to the receiving system.

In another aspect, an apparatus includes: (i) a housing; (ii) a first swing arm coupled to the housing proximate to a first end of the first swing arm, wherein the first swing arm is operable to toggle between a first open position and a first closed position, wherein the first closed position locates a second end of the first swing arm within the housing, wherein the first open position exposes the second end of the first swing arm outside the housing at an acute angle with respect to a first sidewall of the housing, and wherein the first swing arm is adapted to secure a payload of an aerial vehicle when arranged in the first open position; (iii) a second swing arm coupled to the housing proximate to a first end of the second swing arm, wherein the second swing arm is operable to toggle between a second open position and a second closed position, wherein the second closed position locates a second end of the second swing arm within the housing, wherein the second open position exposes the second end of the second swing arm outside the housing at an acute angle with respect to a second sidewall of the housing, and wherein the second swing arm is adapted to secure the payload of the aerial vehicle when arranged in the second open position; (iv) a spring mechanism coupled between the first and second swing arms, wherein the spring mechanism is in a rest state when the first and second swing arms are in the first and second closed positions; (v) a receiving system adapted to receive the housing, wherein the receiving system contacts a cam of one of the first or second swing arms when receiving the housing, thereby causing the other of the first or second swing arms to be arranged in its respective open position, and wherein the receiving system is further adapted to be coupled to the aerial vehicle; and (vi) a spool operable to unwind and wind a tether coupled to the housing, wherein unwinding the tether causes a descent of the housing from the receiving system, and wherein winding the tether causes an ascent of the housing to the receiving system.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1A:
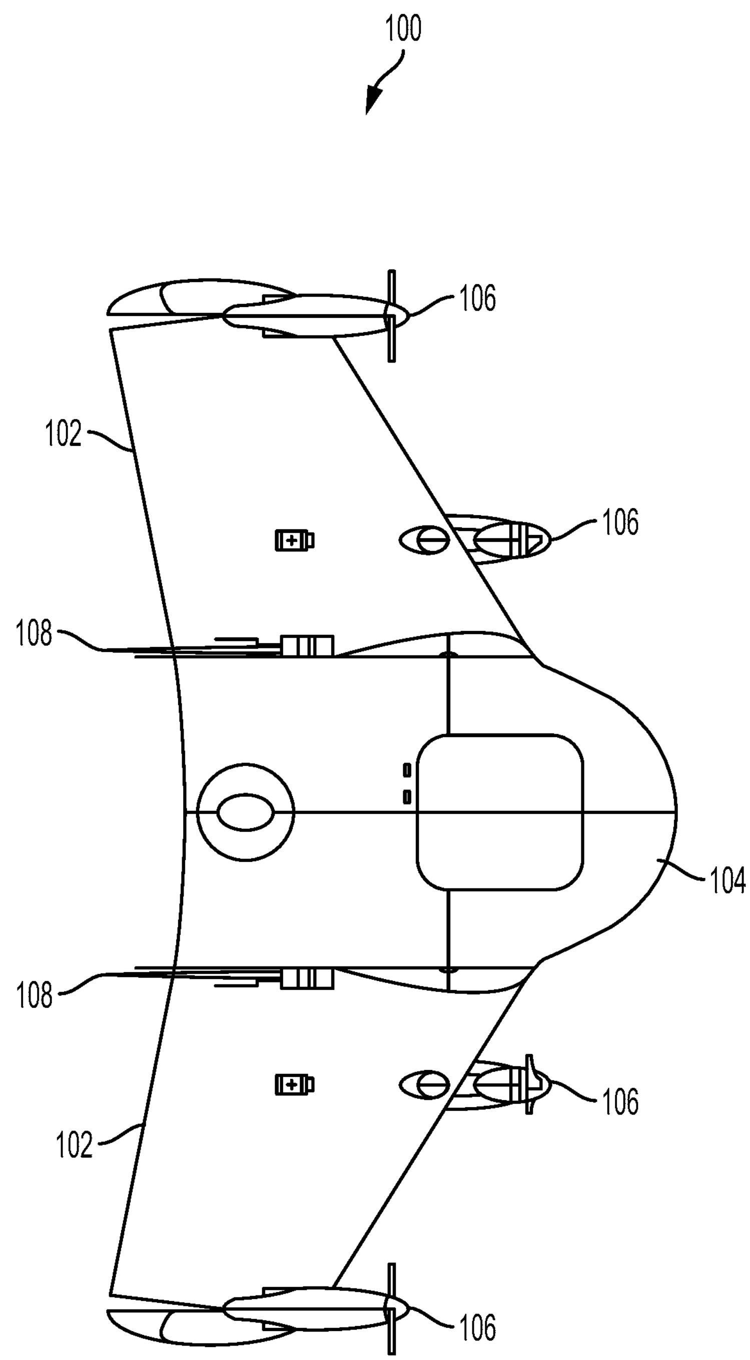
FIG. 1A is a simplified illustration of an unmanned aerial vehicle, according to an example embodiment.

The following detailed description describes various features and functions of the disclosure with reference to the accompanying Figures. In the Figures, similar symbols typically identify similar components, unless context dictates otherwise. The illustrative apparatuses described herein are not meant to be limiting. It will be readily understood that certain aspects of the disclosure can be arranged and combined in a wide variety of different configurations, all of which are contemplated herein.

I. Overview

A UAV may be used to transport and deliver a payload from a source location to a target location. For instance, a person may purchase an item or place a food order via an online marketplace, and a UAV may deliver the purchased food or other item to the person. Such UAV delivery systems may allow for rapid delivery by avoiding delays caused by traffic, package sorting facilities, and human error, among other sources of delay.

In order to deliver the payload, the UAV may include various mechanisms to secure the payload during transport and release the payload upon delivery. Example embodiments may take the form of or otherwise relate to an apparatus for passively attaching a payload to a UAV for transport and releasing the payload upon delivery.

The apparatus may include a housing coupled to the UAV by a tether that may be wound and unwound to raise and lower the housing with respect to the UAV. The housing may include one or more swing arms adapted to extend from the housing at an acute angle, forming a hook on which the payload may be attached. When the housing and attached payload are lowered from the UAV (e.g., by unwinding the tether) to a transport location below the UAV (e.g., the ground), the payload may detach from the hook.

For instance, once the payload reaches the ground, the UAV may continue to lower the housing, and a gravitational and/or an inertial force on the housing may cause the swing arm hook to detach from the payload. Upon detaching from the payload, the swing arm may be adapted to retract into the housing, and the housing may ascend (e.g., by winding the tether) toward the UAV, leaving the payload on the ground. As the housing approaches the UAV, a device adapted to receive the housing may engage a cam of the swing arm causing the swing arm to extend from the housing at an acute angle, thereby forming a hook for securing another payload for delivery by the UAV.

II. Illustrative Unmanned Vehicles

Herein, the terms "unmanned aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

FIG. 1A is a simplified illustration providing a top-down view of a UAV, according to an example embodiment. In particular, FIG. 1A shows an example of a fixed-wing UAV 100, which may also be referred to as an airplane, an aeroplane, a biplane, a glider, or a plane, among other possibilities. The fixed-wing UAV 100, as the name implies, has stationary wings 102 that generate lift based on the wing shape and the vehicle's forward airspeed. For instance, the two wings 102 may have an airfoil-shaped cross section to produce an aerodynamic force on the UAV 100.

As depicted, the fixed-wing UAV 100 may include a wing body 104 rather than a clearly defined fuselage. The wing body 104 may contain, for example, control electronics such as an inertial measurement unit (IMU) and/or an electronic speed controller, batteries, other sensors, and/or a payload, among other possibilities. The illustrative UAV 100 may also include landing gear (not shown) to assist with controlled take-offs and landings. In other embodiments, other types of UAVs without landing gear are also possible.

The UAV 100 further includes propulsion units 106, which can each include a motor, shaft, and propeller, for propelling the UAV 100. Vertical stabilizers 108 (or fins) may also be attached to the wing body 104 and/or the wings 102 to stabilize the UAV's yaw (turn left or right) during flight. In some embodiments, the UAV 100 may be also be configured to function as a glider. To do so, UAV 100 may power off its motor, propulsion units, etc., and glide for a period of time.

During flight, the UAV 100 may control the direction and/or speed of its movement by controlling its pitch, roll, yaw, and/or altitude. For example, the vertical stabilizers 108 may include one or more rudders for controlling the UAV's yaw, and the wings 102 may include one or more elevators for controlling the UAV's pitch and/or one or more ailerons for controlling the UAV's roll. As another example, increasing or decreasing the speed of all the propellers simultaneously can result in the UAV 100 increasing or decreasing its altitude, respectively.

Figure 1B:
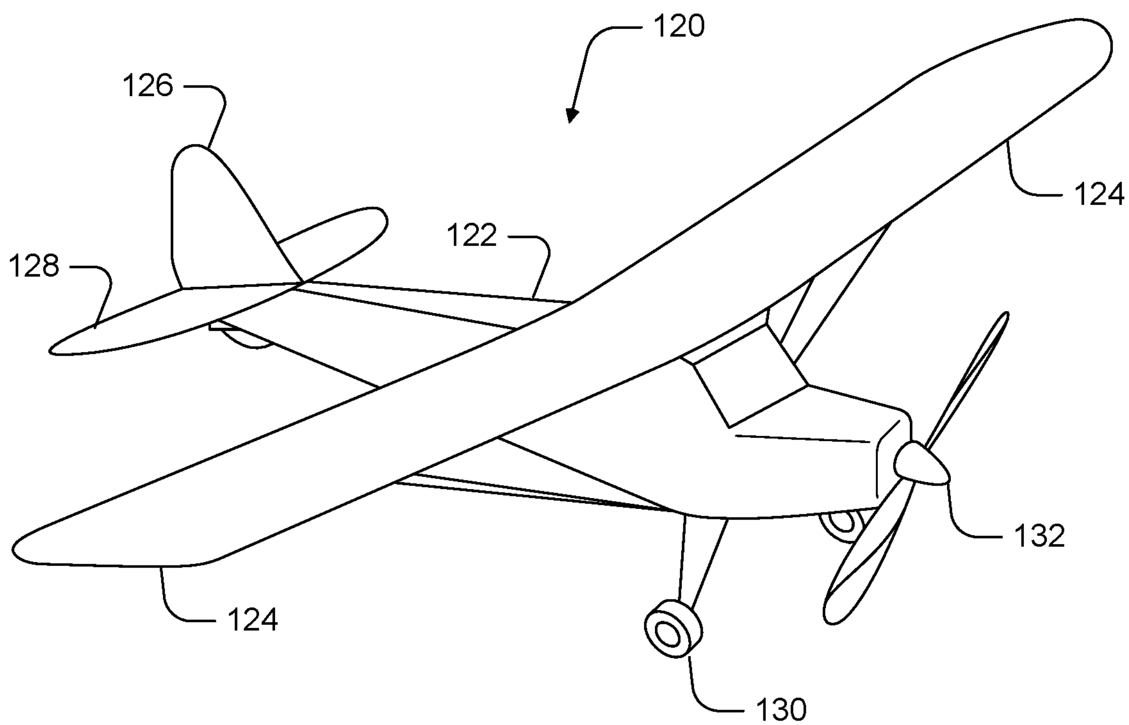
FIG. 1B is a simplified illustration of an unmanned aerial vehicle, according to an example embodiment.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
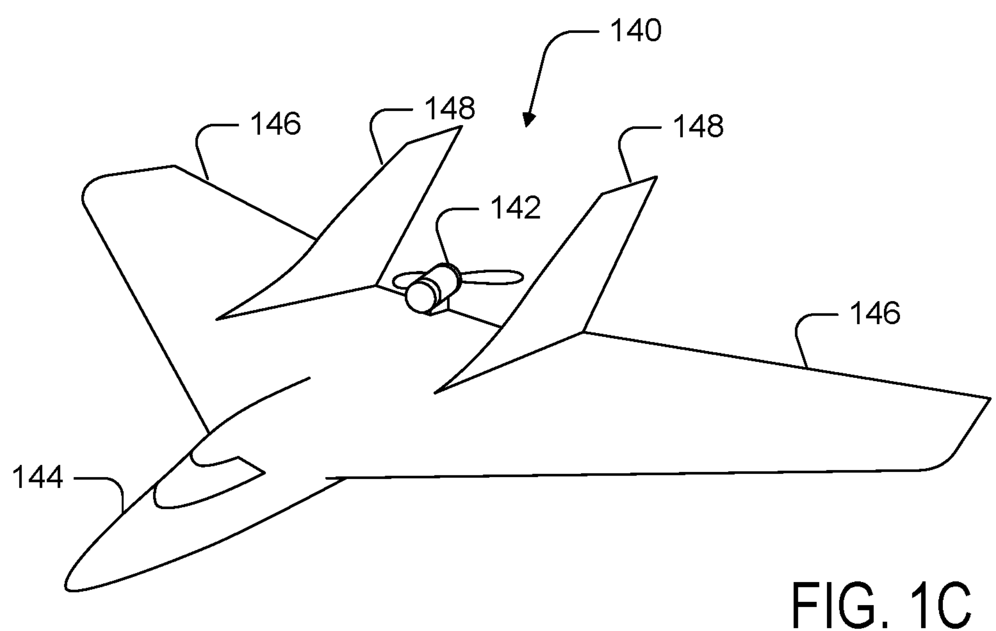
FIG. 1C is a simplified illustration of an unmanned aerial vehicle, according to an example embodiment.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
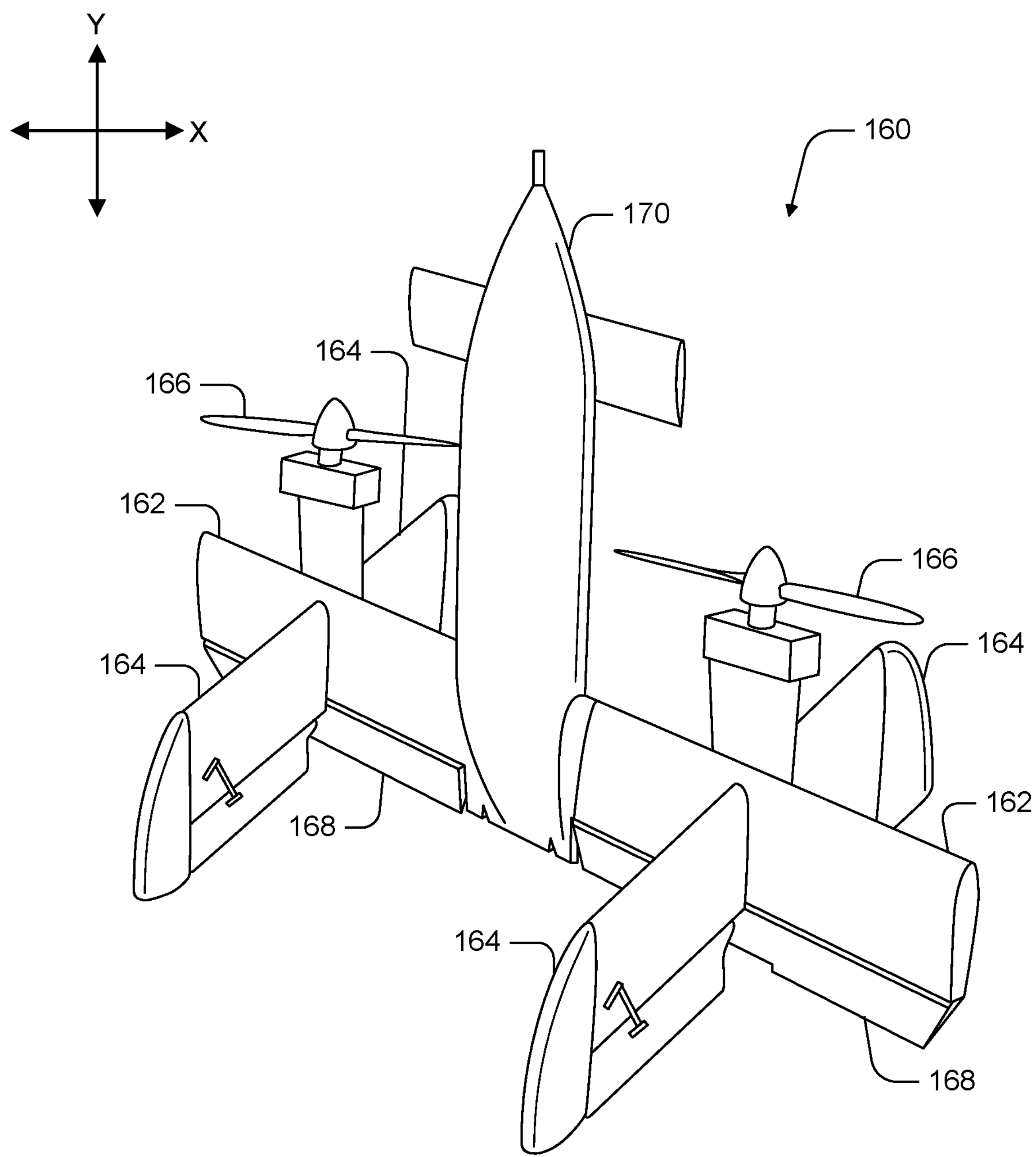
FIG. 1D is a simplified illustration of an unmanned aerial vehicle, according to an example embodiment.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
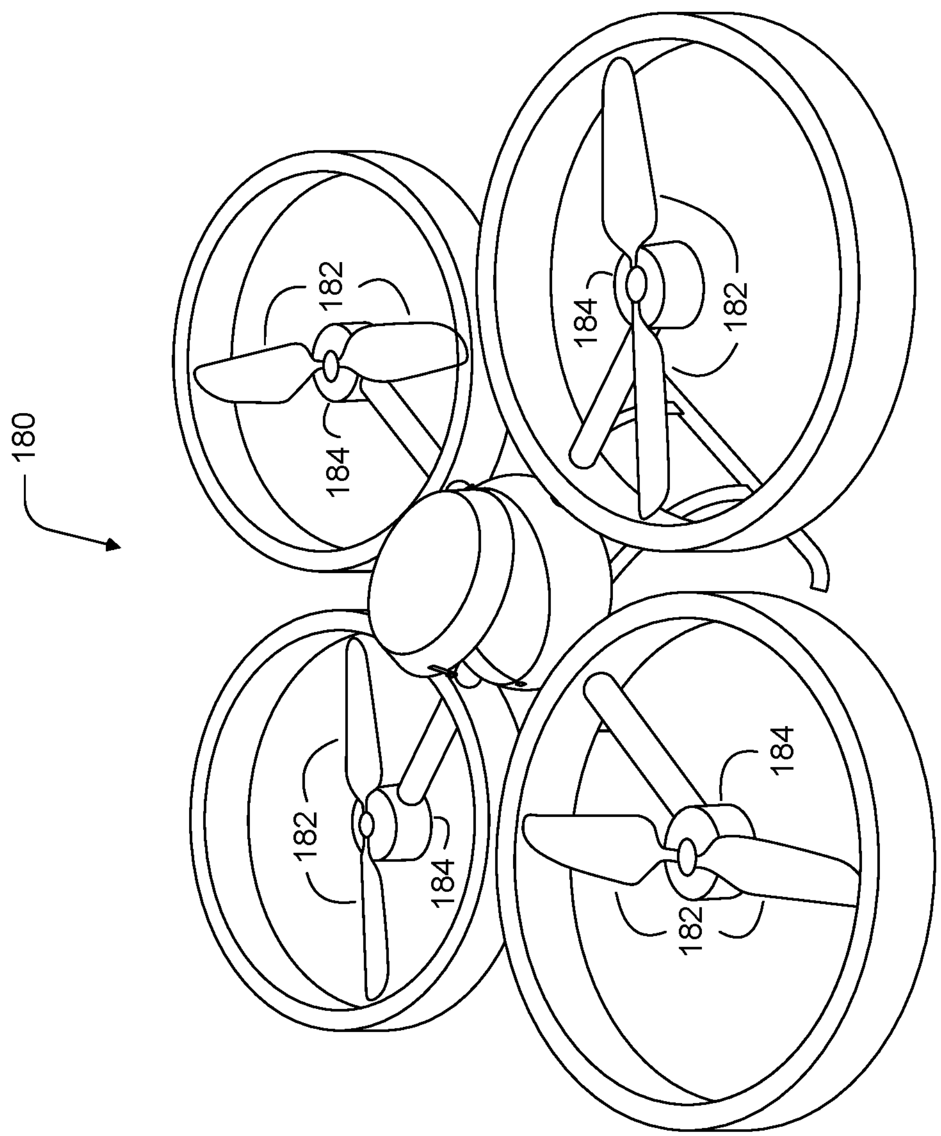
FIG. 1E is a simplified illustration of an unmanned aerial vehicle, according to an example embodiment.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. Illustrative UAV Components

Figure 2:
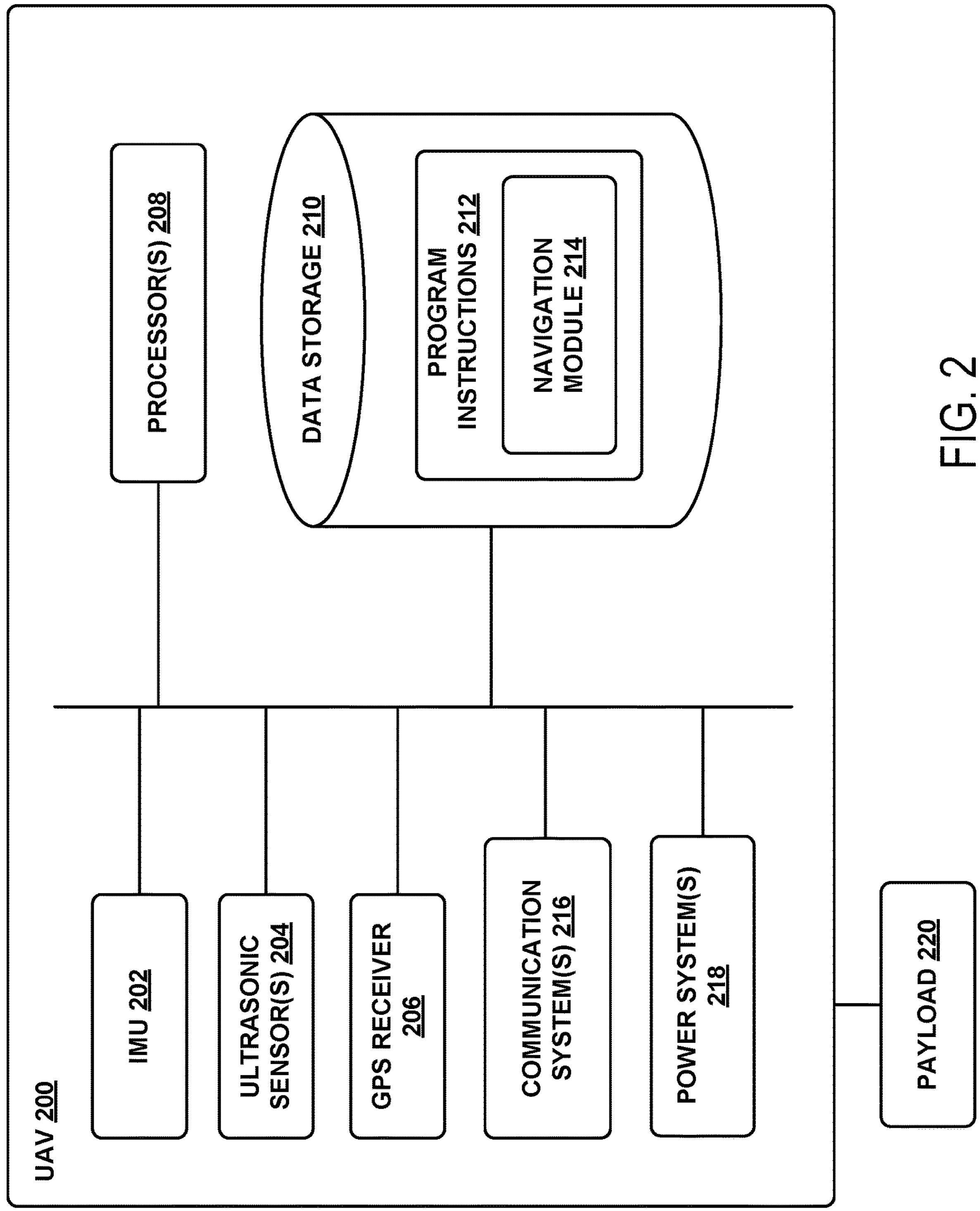
FIG. 2 is a simplified block diagram illustrating components of an unmanned aerial vehicle, according to an example embodiment.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e,g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 220 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 220 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine altitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 216. The communications systems 216 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 216 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 218. The power system 218 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payloads

The UAV 200 may employ various systems and configurations in order to transport a payload 220. In some implementations, the payload 220 of a given UAV 200 may include or take the form of a "package" designed to transport various goods to a target delivery location. For example, the UAV 200 can include a compartment, in which an item or items may be transported. Such a package may one or more food items, purchased goods, medical items, or any other object(s) having a size and weight suitable to be transported between two locations by the UAV. In other embodiments, a payload 220 may simply be the one or more items that are being delivered (e.g., without any package housing the items).

In some embodiments, the payload 220 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 220 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a retractable delivery system that lowers the payload to the ground while the UAV hovers above. For instance, the UAV may include a tether that is coupled to the payload by a release mechanism. A winch can unwind and wind the tether to lower and raise the release mechanism. The release mechanism can be configured to secure the payload while being lowered from the UAV by the tether and release the payload upon reaching ground level. The release mechanism can then be retracted to the UAV by reeling in the tether using the winch.

In some implementations, the payload 220 may be passively released once it is lowered to the ground. For example, a passive release mechanism may include one or more swing arms adapted to retract into and extend from a housing. An extended swing arm may form a hook on which the payload 220 may be attached. Upon lowering the release mechanism and the payload 220 to the ground via a tether, a gravitational force as well as a downward inertial force on the release mechanism may cause the payload 220 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 220 no longer forces the swing arm to extend from the housing. Retracting the swing arm into the housing may reduce the likelihood of the release mechanism snagging the payload 220 or other nearby objects when raising the release mechanism toward the UAV upon delivery of the payload 220.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. Illustrative UAV Deployment Systems

Figure 3:
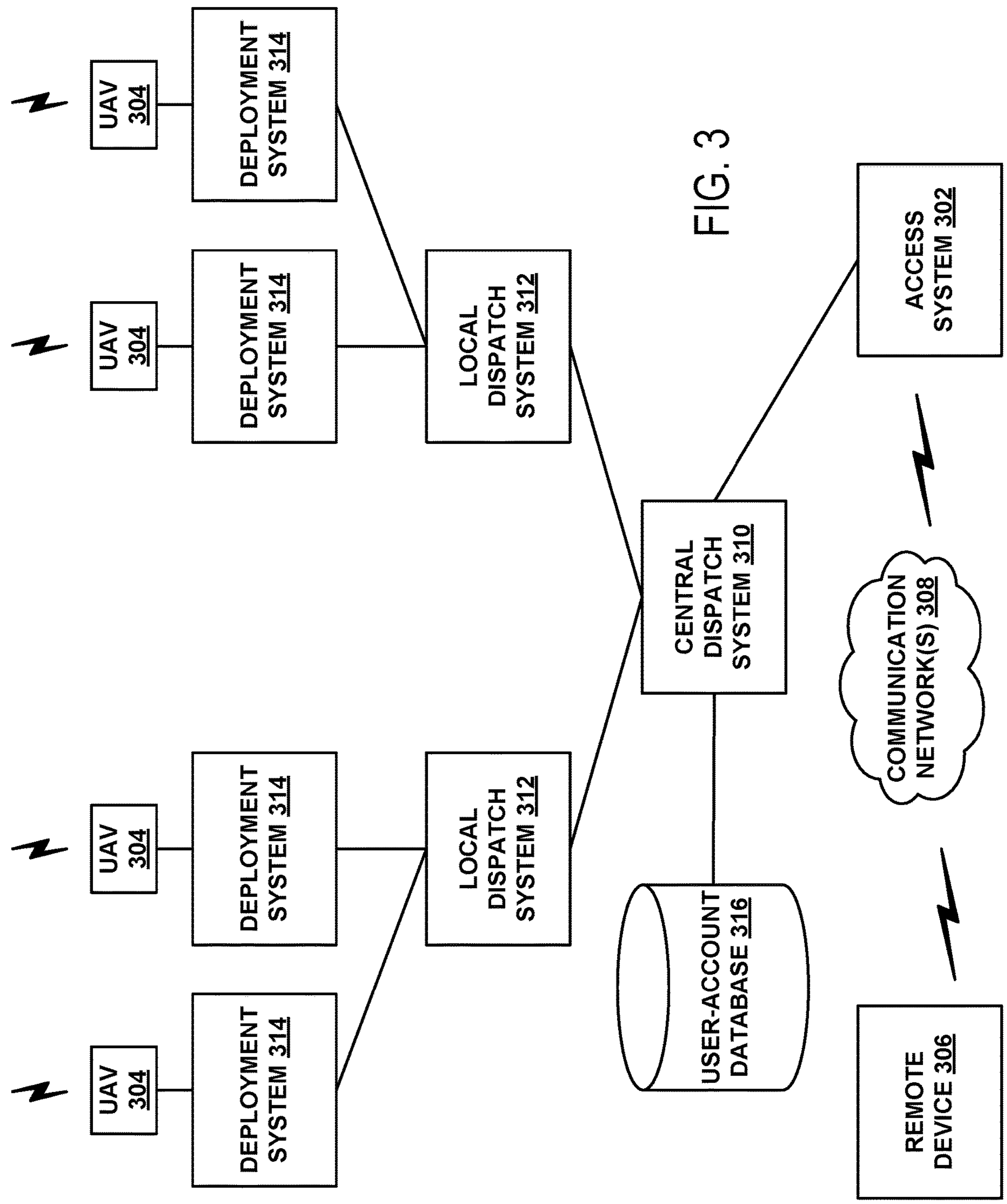
FIG. 3 is a simplified block diagram illustrating a UAV system, according to an example embodiment.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIG. 1, 2, 3, or 4. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more person. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone to, e.g., place a call to an operator of the access system 302 or send a message requesting a UAV-related service to a dispatch system, the phone may be identified via a unique device identification number, and the call or message may then be attributed to the associated user account. Other examples are also possible.

V. Illustrative Payload Release Apparatuses

As discussed above, a UAV may include various types payload delivery systems for lowering the payload to a target delivery location. In some cases, the payload may be coupled to a tether, and the UAV may lower the payload to the ground by lowering the tether. The tether may include an apparatus for releasing the payload, such that the payload may be released on the ground, and the tether may be retracted back to the UAV. As further discussed above, an active payload release apparatus can add undesired size, weight, and complexity to the UAV, and a passive payload release apparatus may help address these issues. However, a passive payload release should also be reliable, avoiding early and unintentional release of the payload during flight to a delivery location and while the payload is being lowered to the ground via the tether. Illustrative embodiments may help to provide such reliable passive payload release mechanisms.

Figure 4:
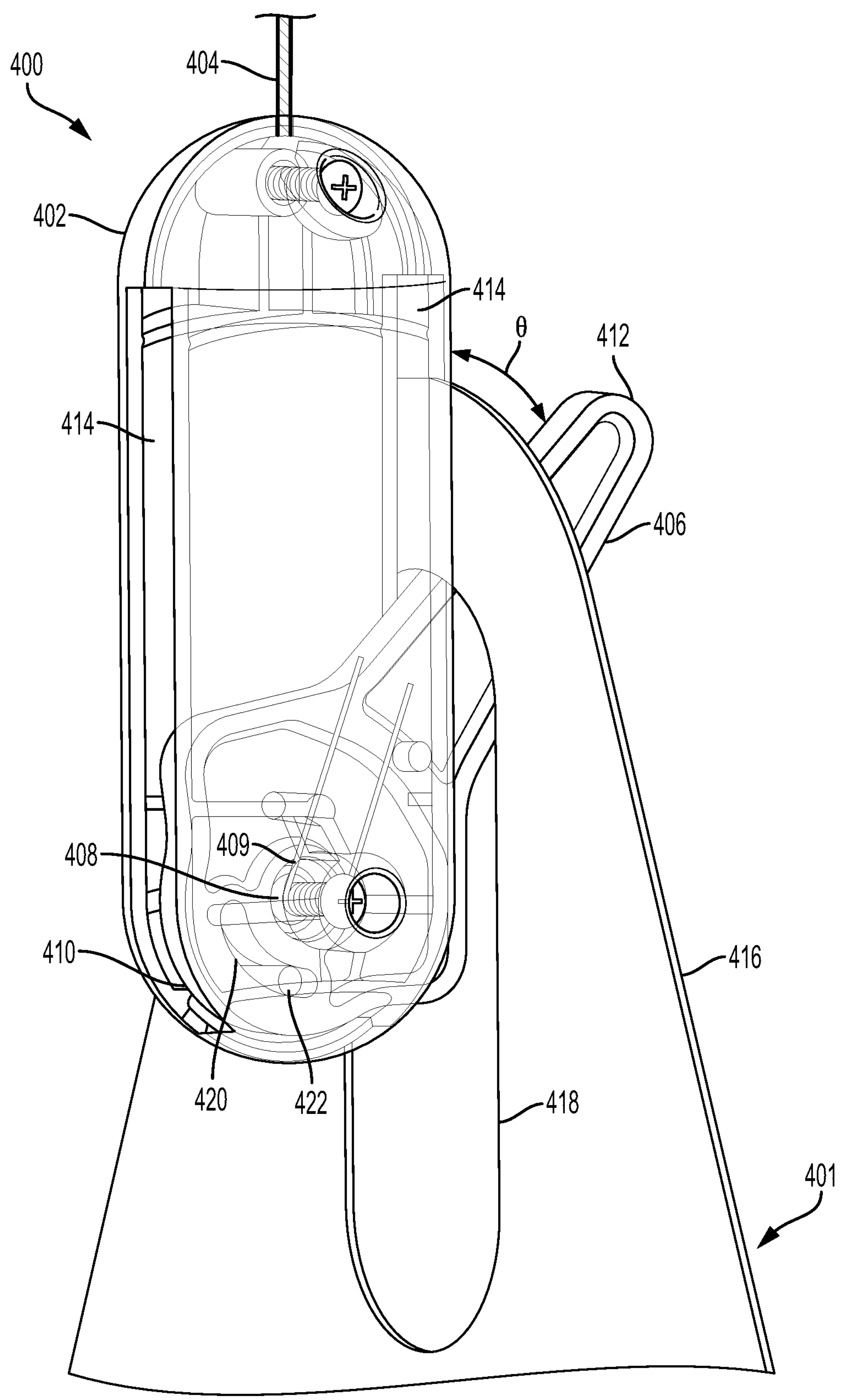
FIG. 4 is an illustration of an apparatus for passively releasing a payload, according to an example embodiment.

FIG. 4 is an illustration of an example apparatus 400 for passively releasing a payload 401. The apparatus 400 includes a housing 402. As illustrated, the housing 402 may take the form of a cylindrical capsule with rounded ends, but other shapes and forms are possible as well (e.g., an ellipsoid, sphere, cuboid, pyramid, cylinder, prism, cone, etc.). The housing 402 may include various materials including, but not limited to, plastics, composites, metals, glass, wood, rubber, or any combination thereof. The housing 402 may be coupled to a tether 404, which is operable to raise and lower the apparatus 400 with respect to a UAV.

A swing arm 406 may be coupled to the housing 402 at a pivot point 408 proximate to a first end 410 of the swing arm 406. The swing arm 406 may be coupled to the housing 402 by a mechanism that allows the swing arm 406 to rotate at least partially around the pivot point 408 (e.g., using any type of various pins, bolts, screws, etc.). The swing arm 406 may partially rotate around the pivot point 408 such that the swing arm 406 may be arranged in various positions.

In a closed position, a second end 412 of the swing arm 406, distal from the first end 410, is located within the housing 402. Throughout this disclosure, the "second" end 412 of the swing arm 406 may also be referred to as the "distal" end 412 of the swing arm 406. In an open position, the distal end 412 extends through an opening 414 of the housing 402. The housing 402 may include two opposing openings 414 such that the swing arm 406 can rotate to extend the distal end 412 from either side of the housing 402.

The apparatus 400 may further include a spring mechanism 409 that biases the swing arm 406 to rotate back into the housing 402 when the payload 401 is not applying a downward force on the swing arm 406. In other words, the spring mechanism 409 may apply a force on the swing arm 406 that resists rotation of the swing arm 406 from the closed position to the open position. For instance, as depicted in FIG. 4, the spring mechanism 409 may take the form of a torsion spring that couples the swing arm 406 to the housing 402 at the pivot point 408. The torsion spring may be in a rest state when the swing arm 406 is in the closed position (i.e., when the distal end 412 is located within the housing), and the torsion spring may be adapted to exert a force on the swing arm 406 opposing rotational motion around the pivot point 408. Thus, when the swing arm 406 is in the open position, the torsion spring may exert a force on the swing arm 406 that is directed toward the closed position. In some examples, the spring mechanism 409 may take on various forms (e.g., an elastic band, a coil spring, a compression spring, an extension spring, etc.) and may be coupled between the swing arm 406 and the housing 402 at various locations.

FIG. 4 illustrates the apparatus 400 in the open position. In the open position, the distal end 412 of the swing arm 406 extends from the housing 402 at an acute angle θ with respect to a sidewall of the housing 402. Thus, in the open position, the swing arm 406 forms a hook on which the payload 401 (e.g., a package containing one or more food items, medical items, or various other goods) may be attached. The payload 401 may include a tab 416 or some other attachment mechanism (e.g., a hook, a ring, etc.) for attaching to the swing arm 406. In order to attach to the swing arm 406, the payload tab 416 may include an opening 418 for receiving the swing arm 406.

As discussed above, the apparatus 400 may include a spring mechanism 409 that forces the swing arm 406 toward the closed position. However, the payload tab 416 may obstruct the opening 414 in the housing, thereby preventing the swing arm 406 from returning to the closed position. Additionally or alternatively, the payload 401 may have a sufficient weight to hold the swing arm 406 in the open position. For instance, the weight of the payload 401 may cause the payload tab 416 to exert a force on the swing arm 406 that is equal to or greater than the force applied by the spring mechanism 409 and in an opposite direction.

In order to prevent the payload tab 416 from detaching from (e.g., sliding off of) the swing arm 406, the angle Θ may have a maximum value less than 90 degrees. In some examples, the maximum value of the angle Θ may fall within the range of 30 to 60 degrees. In order to limit the angle Θ to such a maximum value, the apparatus 400 may include a mechanism to limit, and/or be structurally designed to limit, the rotation of the swing arm 406 around the pivot point 408. For instance, the swing arm 406 may include a slot 420 adapted to receive a pin 422, which may be integrated within the housing 402. As the swing arm 406 rotates around the pivot point 408, the pin 422 may reach an end of the slot 420, thereby preventing further rotation of the swing arm 406 and limiting the angle Θ to its maximum value. The slot 420 and pin 422 are further shown in FIGS. 5A and 5B. In some examples, the dimensions of the openings 414 in the housing 402 may be used to control the maximum value of the angle Θ. For instance, as the swing arm 406 rotates around the pivot point 408, the swing arm 406 may contact the housing 402 at an edge of the opening 414, thereby preventing further rotation of the swing arm 406. Other examples are possible as well.

With the payload 401 attached to the swing arm 406 by the payload tab 416, the apparatus 400 may be lowered from the UAV by the tether 404. For instance, the UAV may include a spool for winding and unwinding the tether 404. By winding the tether 404, the apparatus 400 may be raised toward the UAV, and by unwinding the tether 404, the apparatus 400 may be lowered away from the UAV (e.g., to the ground).

Once the payload 401 has been completely lowered to the ground, the apparatus 400 may passively detach from the payload 401 by continuing to lower the apparatus 400 from the UAV. As the apparatus 400 is lowered, the payload 401 (and consequently the payload tab 416) remains stationary on the ground. As discussed above, the spring mechanism 409 applies a force on the swing arm 406 pulling the swing arm 406 toward the closed position. Thus, by sufficiently lowering the apparatus 400 with respect to the payload tab 416, the spring mechanism 409 causes the distal end 412 of the swing arm 406 to retract through the opening 418 of the payload tab 416 and into the housing 402 (i.e., to the closed position) once the payload tab 416 no longer obstructs the opening 414 of the housing 402.

As illustrated, for instance, the spring mechanism 409 may take the form of a torsion spring such that the weight of the payload 401 pulling down on the swing arm 406 applies a torque to the torsion spring, causing it to twist. Once the payload 401 no longer exerts a force on the swing arm 406 (e.g., due to the payload 401 resting on the ground), the torsion spring may untwist and pull the swing arm 406 back into the housing 402. The spring mechanism 409 may take other various forms as well. For instance, the spring mechanism 409 may include a coiled spring such that the weight of the payload 401 exerts a compressive or tensile force on the spring mechanism, and once the payload 401 no longer exerts a force on the swing arm 406, the coiled spring may push or pull the swing arm 406 back into the housing 402 by decompressing or unstretching. Similarly, the spring mechanism 409 may include an elastic band that may stretch under the weight of the payload 401 and pull the swing arm 406 back into the housing 402 by unstretching once the payload 401 rests on the ground.

When further unwinding the tether 404 and lowering the apparatus 400 after the payload 401 reaches the ground, a downward gravitational force and/or a downward inertial force due to the downward motion of the apparatus 400 cause the apparatus 400 to move downward with respect to the payload tab 416, allowing the swing arm 406 to retract through the opening 418 of the payload tab 416. However, the spring mechanism 409 applies a force to the swing arm 406 in the direction from the open position to the closed position, effectively pinching the payload tab 416 between the swing arm 406 and the housing 402. Thus, a spring mechanism 409 with a particularly large spring constant may cause the payload tab 416 to be pinched between the swing arm 406 and the housing 402 with enough force to counteract the downward gravitational and inertial forces on the apparatus 400. This may prevent the apparatus 400 from being lowered any further once the payload 401 reaches the ground such that the apparatus 400 may not detach from the payload 401.

Thus, in order for the apparatus 400 to passively detach from the payload 401 once the payload 401 reaches the ground, a proper balance may be obtained between a weight of the apparatus 400 and an amount of force applied to the swing arm 406 by the spring mechanism 409. For instance, as the spring constant of the spring mechanism 409 is increased, the weight of the apparatus 400 may also be increased such that the combined gravitational and inertial forces on the apparatus 400 are larger than a frictional force caused by the payload tab 416 being pinched between the swing arm 406 and the housing 402. Because it is typically desirable to avoid adding additional weight to a UAV, the spring constant of the spring mechanism 409 may be minimized such that the weight of the apparatus 400 may also be minimized. However, the spring constant of the spring mechanism 409 should be large enough to hold the swing arm 406 in the closed position when no other external forces are applied to the swing arm 406.

Once the swing arm 406 has detached from the payload tab 416 and retracted into the housing 402, the apparatus 400 may be raised back toward the UAV by winding the tether 404. In order to prevent the apparatus 400 from reattaching to the payload tab 416 or from snagging on nearby objects, an outer surface of the housing may be substantially smooth or free of protrusions. Further, the opening 418 in the payload tab 416 may have a height and/or width smaller than that of the housing 402 in order to prevent the apparatus 400 from passing through the opening 418 and becoming tangled with the payload tab 416.

Figure 5B:
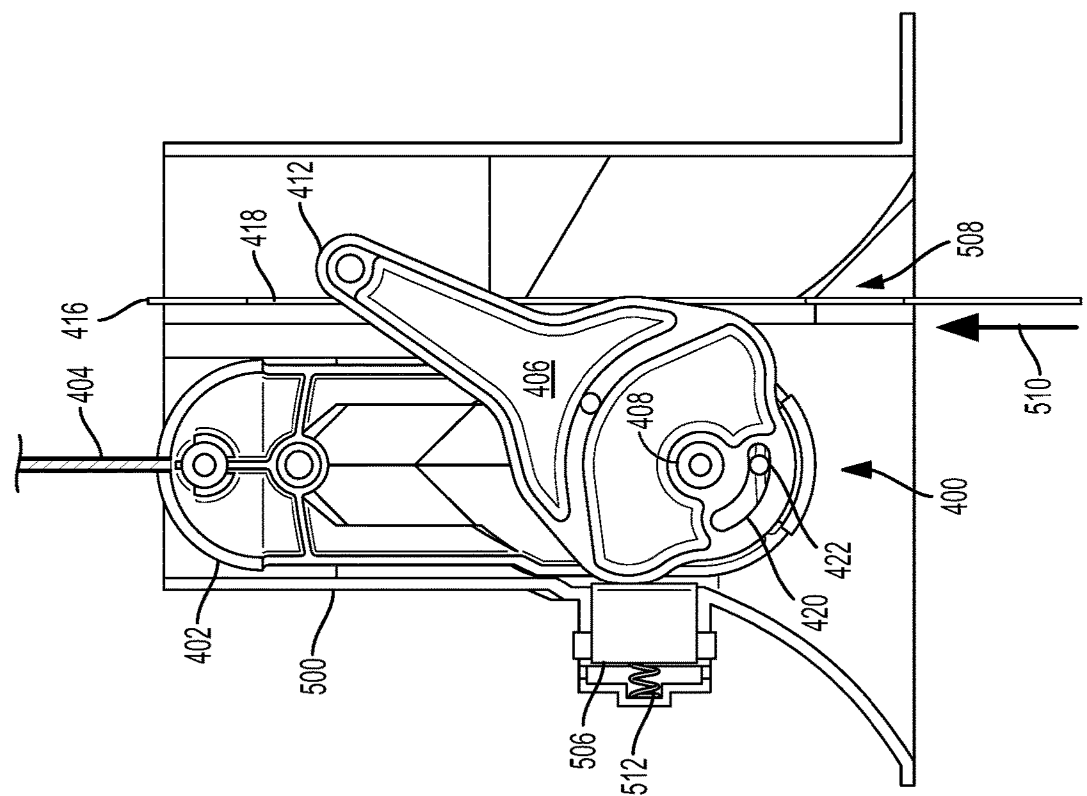
FIG. 5B is an illustration of an apparatus for passively releasing a payload, according to an example embodiment.
Figure 5A:
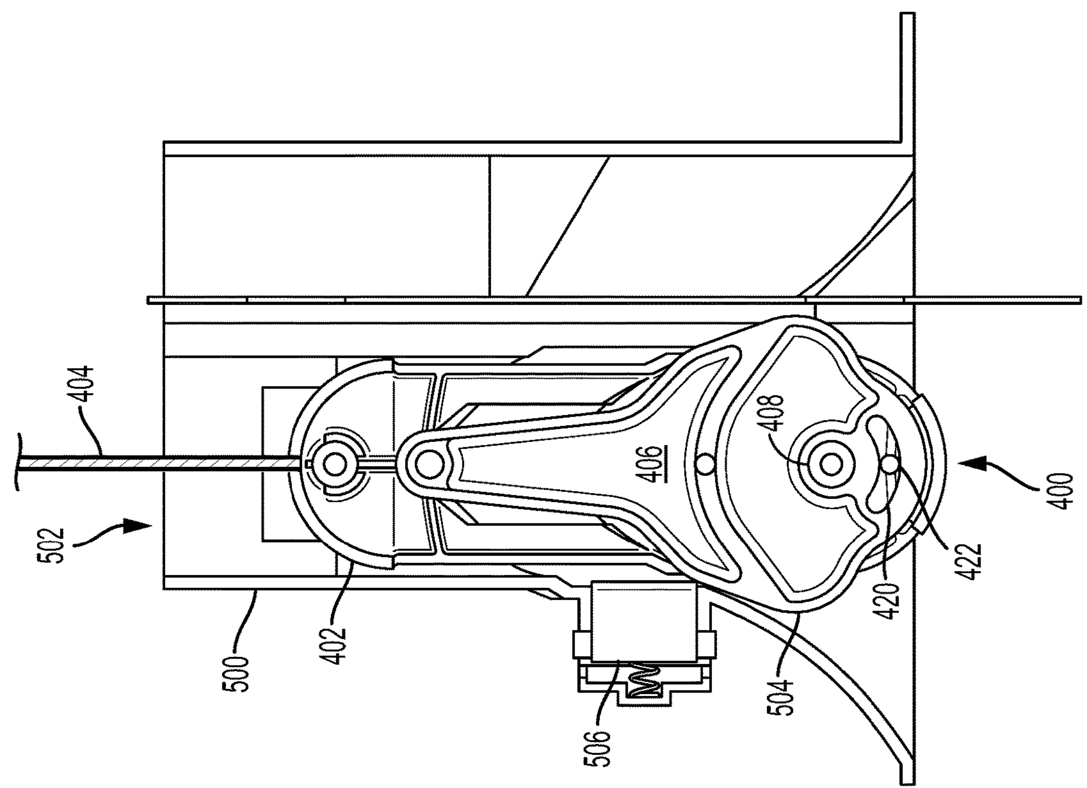
FIG. 5A is an illustration of an apparatus for passively releasing a payload, according to an example embodiment.

Referring next to FIGS. 5A and 5B, a cross-sectional view of an example receiving device 500 for receiving the apparatus 400 is illustrated. The receiving device 500 may be coupled to or integrated in a UAV. For instance, the receiving device 500 may take the form of a feature, compartment, or system in the body of a UAV. As such, the receiving device 500 can receive the apparatus 400 when the UAV raises the apparatus 400 by winding the tether 404. Pulling the apparatus 400 into the receiving device 500 after delivery of the payload 401 may significantly increase the aerodynamics of the UAV. Improved aerodynamics may extend the battery life and/or improve the fuel economy of the UAV, which in turn can extend the UAV's delivery range.

In practice, the receiving device 500 may include a hollow shaft 502 having an inner diameter at least slightly larger than an outer diameter of the housing 402 such that the apparatus 400 may fit inside the shaft 502 when the swing arm 406 is in the closed position as depicted in FIG. 5A. As the UAV winds the tether 404, the apparatus 400 may be pulled further into the shaft 502 until a cam 504 of the swing arm 406 makes contact with a cam follower 506 of the receiving device 500.

As illustrated, the swing arm 406 may include one or more cams 504 that extend through the one or more openings 414 of the housing 402 when the swing arm 406 is in the closed position. When the cam follower 506 contacts the cam 504, the cam follower 506 may exert a force on the cam 504 pushing the cam 504 towards the housing 402, thereby causing the swing arm 406 to rotate around the pivot point 408 until the swing arm 406 is in the open position as depicted in FIG. 5B. In the open position, the distal end 412 of the swing arm 406 may extend through the opening 414 of the housing 402 and through an opening in the shaft 502 of the receiving device 500.

With the swing arm 406 in the open position in the receiving device 500, the payload 401 may be attached to the apparatus 400. For instance, the receiving device 500 may include a slot 508 in which the payload tab 416 may be inserted in the direction indicated by arrow 510. Inserting the payload tab 416 into the slot 508 may cause the payload tab 416 to contact the swing arm 406, forcing the swing arm 406 to rotate around the pivot point 408 toward the closed position.

In order to allow the swing arm 406 to rotate, the cam follower 506 may take the form of a spring-loaded cam follower having a spring 512. When the payload tab 416 forces the swing arm 406 toward the closed position, the cam 504 may press against the cam follower 506 causing the spring 512 to compress. Once the payload tab 416 is fully inserted into the slot 508 (e.g., once the distal end 412 of the swing arm 406 aligns with the opening 418 of the payload tab 416), the swing arm 406 may return to the open position. Specifically, the force of the cam follower 506 against the cam 504 may cause the swing arm 406 to rotate around the pivot point 408 until the distal end 412 of the swing arm 406 extends through the opening 418 of the payload tab 416 at an acute angle with respect to the housing 402.

With the distal end 412 of the swing arm 406 extending through the opening 418 of the payload tab 416 at an acute angle with respect to the housing 402, the swing arm 406 forms a hook on which the payload tab 416 may hang. Thus, the UAV may deliver the payload 401 by lowering the apparatus 400 (and consequently the payload 401 hanging from the apparatus 400) from the receiving device 500 to a target location, at which point the apparatus 400 may detach from the payload 401 as described above with reference to FIG. 4.

While the examples above describe the cam follower 506 of the receiving device 500 contacting the cam 504 of the swing arm 406, thereby causing the swing arm 406 to extend through a particular side of the housing 402 as a payload hook, the present disclosure contemplates similar arrangements in which the cam follower 506 of the receiving device 500 may contact the cam 504 of the swing arm 406, thereby causing the swing arm 406 to extend through the opposite side of the housing 402 as a payload hook. This may be arranged by rotating the apparatus 400 by 180 degrees with respect to the receiving device 500.

Figure 6:
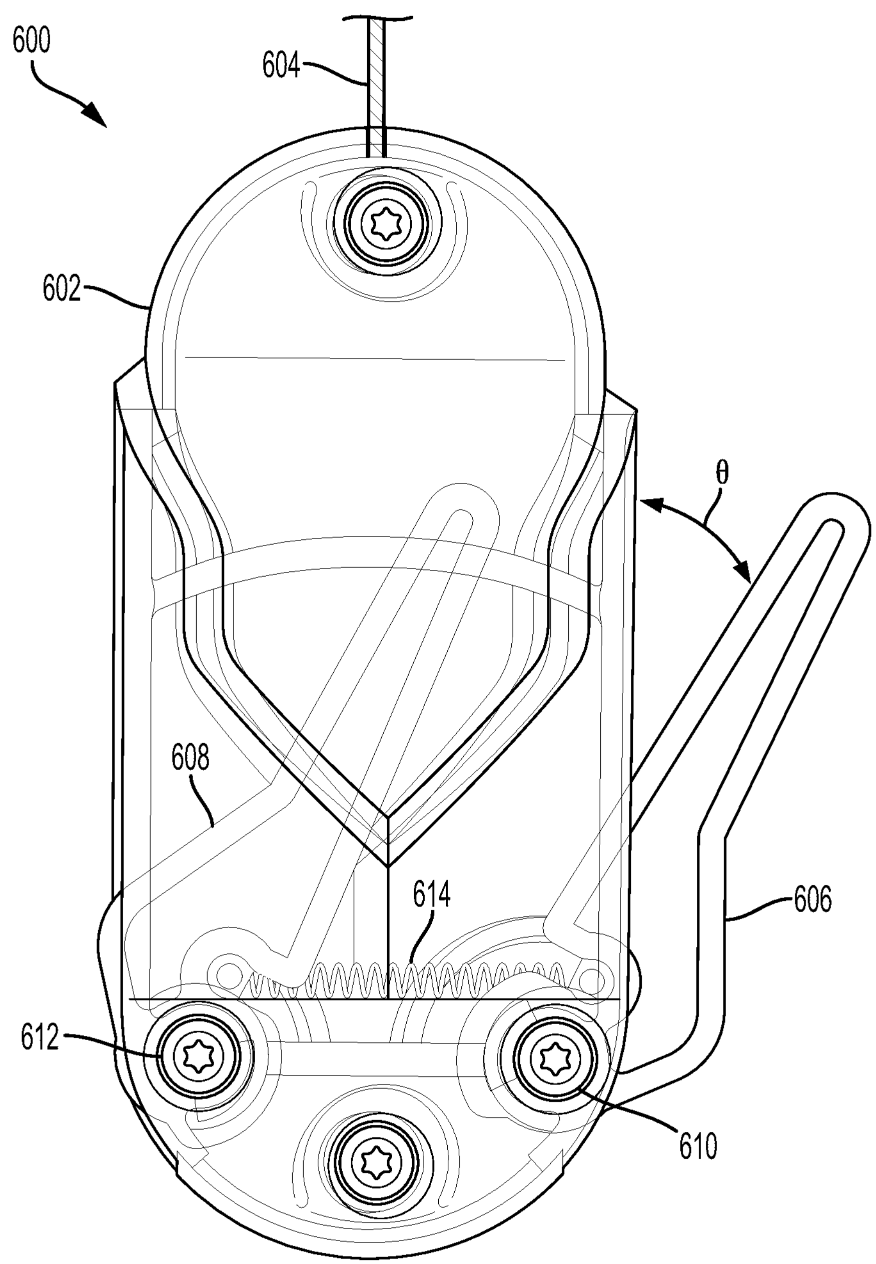
FIG. 6 is an illustration of an apparatus for passively releasing a payload, according to an example embodiment.

Referring next to FIG. 6, another example apparatus 600 for passively releasing a payload is illustrated. Similar to the apparatus 400 depicted in FIG. 4, the apparatus 600 depicted in FIG. 6 may include a housing 602 coupled to a UAV by a tether 604. However, rather than only having one swing arm, the apparatus 600 may include two swing arms 606, 608 each adapted to rotate around one of two pivot points 610, 612. The swing arms 606, 608 may be coupled by a spring 614 such that when the spring is in a rest position, the swing arms 606, 608 are in the closed position (i.e., the distal ends of the swing arms 606, 608 are located within the housing 602). While the spring 614 is depicted as a standard coil spring, in other examples it may take various forms including, but not limited to, an extension spring, a compression spring, and elastic band, etc.

Further, the spring 614 may be adapted such that when one swing arm rotates, the spring 614 causes the other swing arm to rotate in a similar manner. For instance, when swing arm 606 rotates around pivot point 610, the spring 614 may cause swing arm 608 to rotate around pivot point 612 in a similar manner. Thus, as illustrated in FIG. 6, when swing arm 608 rotates clockwise around pivot point 612 (e.g., when swing arm 608 is pressed further into the housing 602), the spring 614 may cause swing arm 606 to rotate clockwise around pivot point 610, thereby forcing swing arm 606 to extend from the housing 602 at an acute angle Θ in the open position. Similarly, forcing swing arm 606 into the housing 602 may cause swing arm 608 to extend from the housing 602 in the open position. In some embodiments, the apparatus 600 may include a rigid member, in addition to or in the alternative to the spring 614, coupled between the swing arms 606, 608 in order to sync the rotation of the swing arms 606, 608 around the pivot points 610, 612.

With the swing arm 606 in the open position (i.e., extending through an opening of the housing 602 at an acute angle with respect to the housing 602), the swing arm 606 forms a hook on which a UAV payload may hang. Thus, the UAV may deliver the payload by lowering the apparatus 600 (and consequently the payload hanging from the apparatus 600) to a target location, at which point the apparatus 600 may detach from the payload as described above with reference to the apparatus 400 depicted in FIG. 4. Specifically, the UAV may continue to lower the apparatus 600 after the payload has reached the ground. A gravitational force, as well as an inertial force due to the downward motion of the apparatus 600, may force the apparatus 600 downward, causing the payload to detach from the hook formed by the swing arm 606. Without the weight of the payload pulling on the swing arm 606, the spring 614 may return to its rest state, causing the swing arms 606, 608 to be arranged to the closed position with their distal ends located inside the housing 602. The UAV may then raise the apparatus 600 upwards toward the UAV by winding the tether 604.

As the apparatus 600 is raised into an opening in the lower side of the UAV by the tether, a receiving device, such as the receiving device 700, may receive the apparatus 600. Like the receiving device 500 depicted in FIGS. 5A and 5B, the receiving device 700 depicted in FIGS. 7A and 7B may include a hollow shaft 702 having an inner diameter at least slightly larger than an outer diameter of the housing 602 such that the apparatus 600 may fit inside the shaft 702 when the swing arms 606, 608 are in the closed position as depicted in FIG. 7A.

As the UAV winds the tether 604, the apparatus 600 may be pulled further into the shaft 702 until a cam 704 of one of the swing arms 606, 608 makes contact with a cam follower 706 of the receiving device 700. As illustrated, the swing arms 606, 608 may include cams 704 that extend outside of the housing 602 when the swing arms 606, 608 are in the closed position. In some embodiments, the cam follower 706 may be a spring-loaded cam follower similar to the cam follower 506 depicted in FIGS. 5A and 5B. Alternatively, the cam follower 706 may be a rotating element, such as a wheel, adapted to make a rolling contact with the cam 704, or the cam follower 706 may be a stationary element, such as a surface of the hollow shaft 702.

Figure 7B:
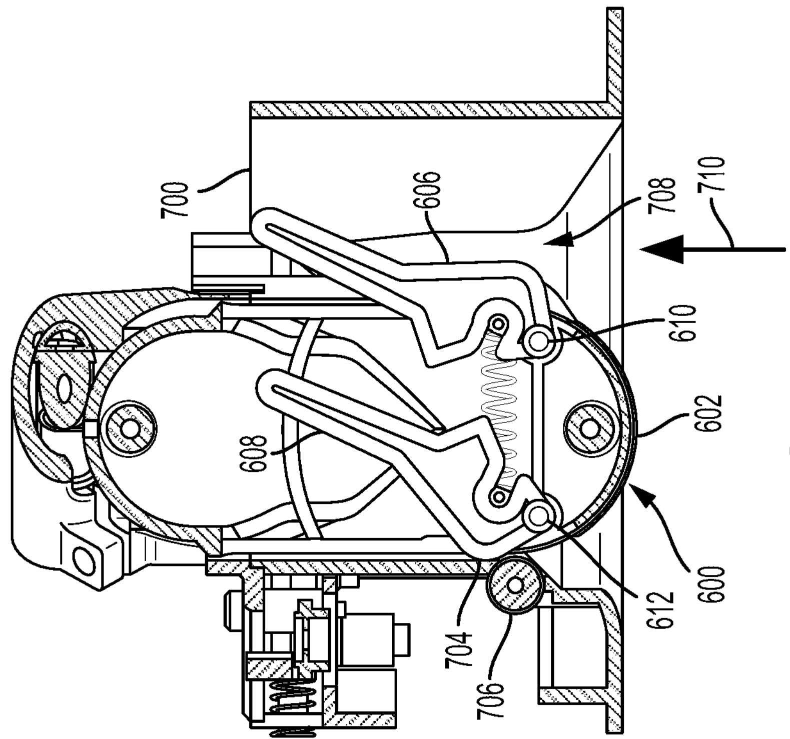
FIG. 7B is an illustration of an apparatus for passively releasing a payload, according to an example embodiment.
Figure 7A:
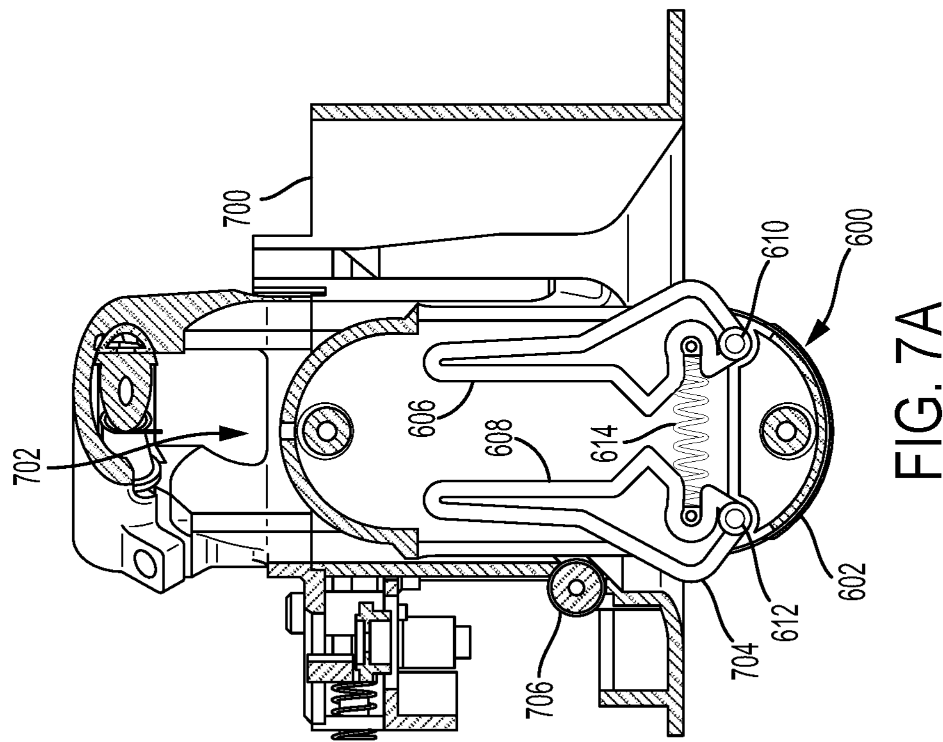
FIG. 7A is an illustration of an apparatus for passively releasing a payload, according to an example embodiment.

In the arrangement depicted in FIG. 7A, when the cam follower 706 contacts the cam 704, the cam follower 706 may exert a force on the cam 704 pushing the cam 704 towards the housing 602, thereby causing swing arm 608 to rotate around pivot point 612. This rotation of swing arm 608 may compress the spring 614, causing the spring 614 to exert a force on swing arm 606. The force on swing arm 606 may cause swing arm 606 to rotate around pivot point 610 until swing arm 608 is in the open position as depicted in FIG. 7B. In the open position, the distal end of swing arm 606 may extend through an opening of the housing 602 and through an opening in the shaft 702 of the receiving device 700.

With swing arm 606 in the open position in the receiving device 700, a payload may be attached to the apparatus 600. For instance, the receiving device 700 may include a slot 708 in which a payload tab (e.g., the payload tab 416 depicted in FIG. 4) may be inserted in the direction indicated by arrow 710. Inserting the payload tab into the slot 708 may cause the payload tab to contact swing arm 606, forcing swing arm 606 to rotate around pivot point 610 toward the closed position.

With the cam follower 706 pressing swing arm 608 into the housing 602 on one side and the payload tab pressing swing arm 606 into the housing 602 on the other side, the spring 614 coupled between the swing arms 606, 608 may be compressed. Thus, once the payload tab is fully inserted into the slot 708 (e.g., once the distal end of swing arm 606 aligns with an opening of the payload tab), the spring 614 may expand and cause swing arm 606 to return to the open position. Specifically, the force of the cam follower 706 against the cam 704 may prevent the spring 614 from causing swing arm 608 to rotate around pivot point 612 so that when the spring 614 expands only swing arm 606 rotates around pivot point 610. In this arrangement, the distal end of swing arm 606 extends through the opening of the payload tab at an acute angle with respect to the housing 602.

When the distal end of swing arm 606 is positioned at an acute angle with respect to the housing 602, the swing arm 606 forms a hook on which the payload tab may hang. Thus, the UAV may deliver the payload by lowering the apparatus 600 (and consequently the payload hanging from the apparatus 600) from the receiving device 700 to a target location, at which point the apparatus 600 may detach from the payload as described above with reference to FIGS. 4 and 6.

While the examples above describe the cam follower 706 of the receiving device 700 contacting the cam 704 of swing arm 608, thereby pressing swing arm 608 into the housing 602 and causing swing arm 606 to extend from the housing as a payload hook, the present disclosure contemplates similar arrangements in which the cam follower 706 of the receiving device 700 may contact the cam 704 of swing arm 606, thereby pressing swing arm 606 into the housing 602 and causing swing arm 608 to extend from the housing as a payload hook. This may be arranged by rotating the apparatus 600 by 180 degrees with respect to the receiving device 700.

Figure 8B:
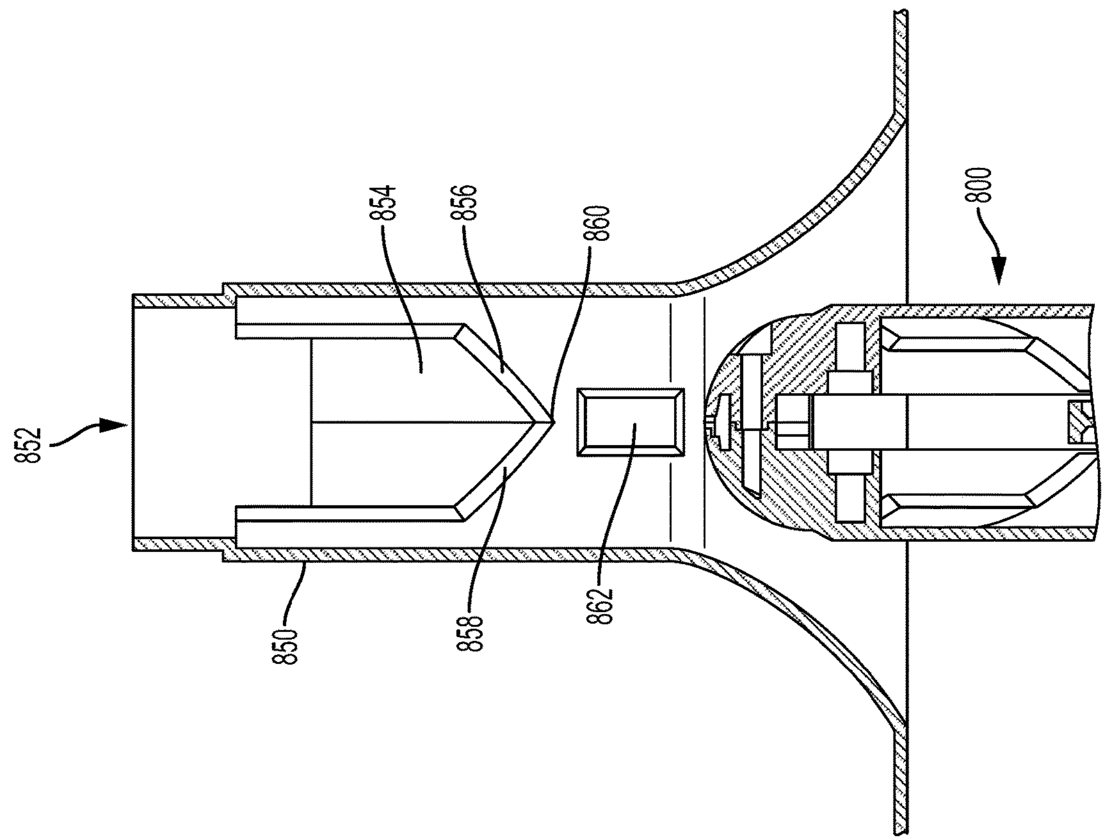
FIG. 8B is an illustration of an apparatus for passively releasing a payload, according to an example embodiment.
Figure 8A:
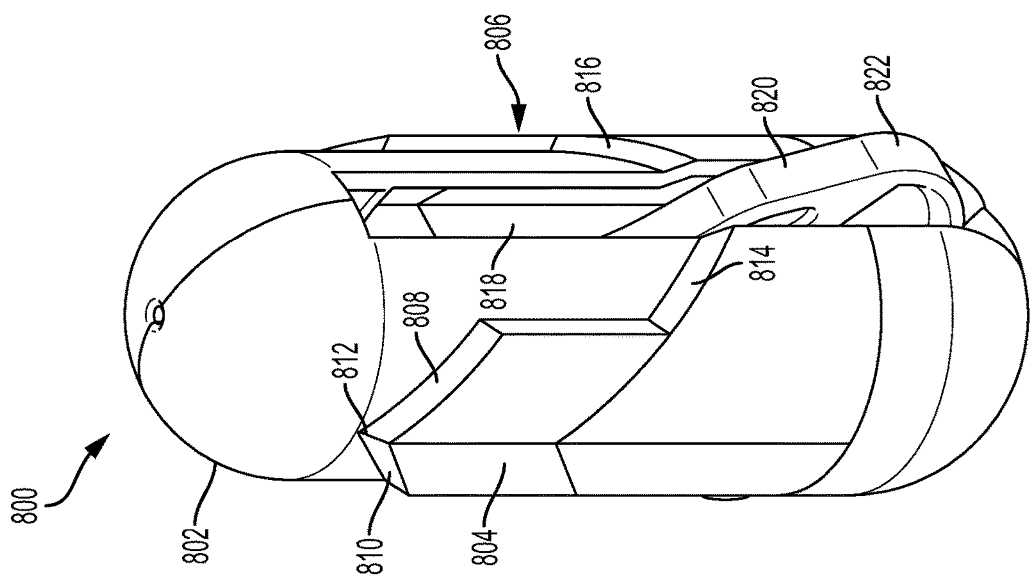
FIG. 8A is an illustration of an apparatus for passively releasing a payload, according to an example embodiment.

Referring back to FIGS. 5A, 5B, 7A, and 7B, in order for the cam followers 506, 706 of the receiving devices 500, 700 to contact the cams 504, 704 of the swing arms 406, 606, 608, the apparatuses 400, 600 may need to be properly aligned with the receiving devices 500, 700. Thus, the apparatuses 400, 600 and the receiving devices 500, 700 may include one or more alignment mechanisms. FIGS. 8A and 8B illustrate such alignment mechanisms, according to an example embodiment.

FIG. 8A depicts an example apparatus 800 that may be similar in form to the apparatuses depicted in FIGS. 4 and 6, and FIG. 8B depicts an example receiving device 850 for receiving the apparatus 800 that may be similar in form to the receiving devices depicted in FIGS. 5A, 5B, 7A, and 7B.

The apparatus 800 may include a housing 802 having a first alignment mechanism. The first alignment mechanism may include a protruding area 804 that protrudes from the housing 802 and a recessed area 806 adjacent to the protruding area 804 that is recessed with respect to the protruding area 804. A portion of the protruding area 804 may be defined by a first helical edge 808 and a second helical edge 810. Helical edge 808 may be arranged along a portion of a helical path traversing a portion of the housing 802 at a first slope. Similarly, helical edge 810 may be arranged along a portion of a helical path traversing a portion of the housing 802, but at a second slope opposite in direction from the first slope. In this manner, the helical edges 808, 810 may intersect at an apex 812 of the protruding area 804.

The recessed area 806 adjacent to the protruding area 804 may also include a first helical edge 814 and a second helical edge 816. Helical edge 814 may be arranged along a portion of a helical path traversing a portion of the housing 802, and such a helical path may have a slope similar or equivalent to the slope of the helical path defined by helical edge 808 of the protruding area 804. Similarly, helical edge 816 may be arranged along a portion of a helical path traversing a portion of the housing 802, and such a helical path may have a slope similar or equivalent to the slope of the helical path defined by helical edge 810 of the protruding area 804. In this manner, the helical paths defined by helical edges 814, 816 may be arranged to intersect at an apex of the recessed area 806. However, as depicted in FIG. 8A, this intersection point of the helical paths may coincide with an opening 818 in the housing 802 through which a swing arm 820 may extend. Thus, the helical edges 814, 816 of the recessed area 806 may not converge with one another.

In addition to the protruding area 804 and the recessed area 806, the apparatus 800 may further include a second protruding area (not shown) similar in design to the protruding area 804 located on a side of the housing 802 directly opposite the protruding area 804, as well as a second recessed area (not shown) similar in design to the recessed area 806 located on a side of the housing 802 directly opposite the recessed area 806. Such an arrangement of opposing protruding and recessed areas may allow for the apparatus 800 to be aligned in one of two positions rotationally offset from one another by 180 degrees, as discussed in more detail below with reference to FIG. 8B.

As depicted in FIG. 8B, the receiving device 850 may include a hollow shaft 852 for receiving the apparatus 800, and the hollow shaft 852 may include a second alignment mechanism adapted to interlock with the first alignment mechanism of the apparatus 800. The second alignment mechanism may include a protruding area 854 that protrudes from a surface of the shaft 852. Similar to the protruding area 804 of the apparatus 800, a portion of the protruding area 854 of the receiving device 850 may be defined by a first helical edge 856 and a second helical edge 858. Helical edge 856 may be arranged along a portion of a helical path having a first slope and traversing a portion of the shaft 852. Similarly, helical edge 858 may be arranged along a portion of a helical path having a second slope and traversing a portion of the shaft 852. The slopes of helical edges 856 and 858 may be similar or equivalent to the slopes of helical edges 814 and 816, respectively, such that helical edges 856 and 858 may intersect at an apex 860 of the protruding area 854.

When the apparatus 800 is received by the receiving device 850 (e.g., due to a UAV winding a tether coupled to the apparatus 800), the alignment mechanisms of the apparatus 800 and the receiving device 850 may contact one another. In practice, an edge of the protruding area 854 of the receiving device 850 may contact an edge of the protruding area 804 of the apparatus 800. Based on the manner in which the protruding areas 854, 804 contact one another, the apparatus 800 may rotate within the receiving device 850 until the alignment mechanisms interlock, that is, when the protruding area 854 of the receiving device 850 aligns with the recessed area 806 of the apparatus 800.

As the apparatus 800 is pulled into the receiving device 850, the alignment mechanism of the receiving device 850 may align with various portions of the alignment mechanism of the apparatus 800. In one example, as depicted in FIG. 8B, apex 860 may align with the intersection point of the helical paths associated with helical edges 814 and 816. In this case, the apparatus 800 may not rotate at all, as the alignment mechanisms are already aligned such that protruding area 854 may interlock with recessed area 806. In another example, apex 860 may align with helical edge 808. In this case, helical edges 808 and 856 may contact one another, and their helical shapes may cause the apparatus 800 to rotate clockwise until protruding area 854 aligns with and interlocks with recessed area 806. In yet another example, apex 860 may align with helical edge 810. In this case, helical edges 810 and 858 may contact one another, and their helical shapes may cause the apparatus 800 to rotate counterclockwise until protruding area 854 aligns with and interlocks with the recessed area (not shown) that is opposite from recessed area 806. Other examples are possible as well.

In some examples, one of the protruding areas of the apparatus 800 (e.g., the first protruding area 804 or the opposing second protruding area (not shown)) may include a rounded apex. For instance, as illustrated, apex 812 includes a sharp edge at the intersection of helical edges 808 and 810. The second protruding area on the opposite side of the apparatus 800, on the other hand, may have helical edges that intersect to form a less sharp and more rounded apex. In such an example, the sharp apex 812 may engage a portion of protruding area 854 of the receiving device 850 before the rounded apex engages an opposing protruding area. This may help prevent situations in which the protruding areas of the apparatus 800 engage the protruding areas of the receiving device 850 on the same side of the helical features of the receiving device 850, which may cause the apparatus 800 to be pushed to one side of the hollow shaft 852 and jam rather than rotating the apparatus 800 into alignment.

When the alignment mechanisms of the apparatus 800 and the receiving device 850 interlock with one another, a cam follower 862 of the receiving device 850 may align with a cam 822 of the swing arm 820. The cam follower 862 may contact the cam 822, causing the swing arm 820 to rotate and extend outside of the housing 802, as discussed above with reference to FIGS. 5A and 5B, such that the swing arm 820 forms a hook on which a payload of the UAV may be attached. Further, while FIGS. 8A and 8B illustrate an apparatus having one swing arm 820, in other examples the apparatus 800 may have two swing arms, as depicted in FIGS. 6-7B.

VII. Conclusion

While various aspects of the disclosure have been disclosed herein, other aspects and embodiments will be apparent to those skilled in the art. Accordingly, the embodiments disclosed herein are for purposes of illustration, and are not intended to be limiting, with the true scope and spirit of the disclosure being indicated by the following claims.

What is claimed is:

1. An apparatus comprising:

a housing;

a first swing arm coupled to the housing proximate to a first end of the first swing arm, wherein the first swing arm is operable to toggle between a first open position and a first closed position, wherein the first closed position locates a second end of the first swing arm within the housing, wherein the first open position exposes the second end of the first swing arm outside the housing at an acute angle with respect to a first sidewall of the housing such that the first swing arm is positioned to secure a payload to the housing;

a second swing arm coupled to the housing proximate to a first end of the second swing arm, wherein the second swing arm is operable to toggle between a second open position and a second closed position, wherein the second closed position locates a second end of the second swing arm within the housing, wherein the second open position exposes the second end of the second swing arm outside the housing at an acute angle with respect to a second sidewall of the housing such that the second swing arm is positioned to secure the payload to the housing;

a mechanism coupled between the first and second swing arms;

wherein a cam of one of the first or second swing arms, when contacted by a receiving device receiving the housing, causes, via the mechanism, the other of the first or second swing arms to be arranged in its respective open position.

2. The apparatus of claim 1, wherein the receiving device contacting the cam of the first swing arm causes the mechanism to exert a force on the second swing arm, and wherein the force is in a direction from the second closed position toward the second open position.

3. The apparatus of claim 1, wherein the mechanism comprises a rigid member coupled between the first and second swing arms, wherein the receiving system contacting the cam of the first swing arm causes the rigid member to exert a force on the second swing arm, and wherein the force is in a direction from the second closed position toward the second open position.

4. The apparatus of claim 1, wherein the mechanism comprises a spring coupled between the first and second swing arms, wherein the receiving system contacting the cam of the first swing arm causes the rigid member to exert a force on the second swing arm, and wherein the force is in a direction from the second closed position toward the second open position.

5. The apparatus of claim 1, wherein the housing includes a first alignment feature, wherein the first alignment feature is adapted to interlock with a second alignment feature of the receiving system.

6. The apparatus of claim 5, wherein interlocking the first and second alignment features causes the housing to be arranged such that the receiving system contacts the cam of one of the first or second swing arms.

7. The apparatus of claim 5, wherein interlocking the first and second alignment features aligns one of the first or second swing arms with an opening in the receiving system such that the second end of the aligned first or second swing arm extends through the opening when the aligned first or second swing arm is in its respective open position.

8. The apparatus of claim 5, wherein the first alignment feature includes a helical feature, and wherein the first alignment feature of the housing contacting the second feature of the receiving system causes the housing to rotate around a rotational axis of the housing until the first and second alignment features interlock.

9. The apparatus of claim 1, wherein the payload comprises at least one tab adapted to couple to at least one of the first or second swing arms to secure the payload before and during descent, and wherein the at least one tab is adapted to decouple from the at least one of the first or second swing arms upon complete descent of the payload.

10. The apparatus of claim 9, wherein a gravitational force on the housing is sufficient to cause the at least one tab to decouple from the at least one of the first or second swing arms upon complete descent of the payload.

11. The apparatus of claim 9, wherein the mechanism causes the swing arm to toggle to the closed position when the at least one tab of the payload decouples from the swing arm.

* * * * *